(12) United States Patent
Suzuki et al.

(10) Patent No.: US 9,870,680 B2
(45) Date of Patent: Jan. 16, 2018

(54) COMMUNICATION LIGHT VISUALIZATION STRUCTURE

(71) Applicant: Hitachi Metals, Ltd., Tokyo (JP)

(72) Inventors: Kanako Suzuki, Tokyo (JP); Mikio Ohkoshi, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/255,194

(22) Filed: Sep. 2, 2016

(65) Prior Publication Data

US 2017/0084134 A1 Mar. 23, 2017

(30) Foreign Application Priority Data

Sep. 17, 2015 (JP) .................. 2015-184103

(51) Int. Cl.
*G08B 5/36* (2006.01)
*H04B 10/075* (2013.01)
(Continued)

(52) U.S. Cl.
CPC ............. *G08B 5/36* (2013.01); *H04B 10/075* (2013.01); *H04B 10/25* (2013.01)

(58) Field of Classification Search
None
See application file for complete search history.

(56) References Cited

U.S. PATENT DOCUMENTS

RE40,150 E * 3/2008 Ishibashi .............. G02B 6/4246 361/785
2004/0076378 A1 * 4/2004 Takeda ................. G02B 6/3849 385/77

(Continued)

FOREIGN PATENT DOCUMENTS

JP 2009-145676 A 7/2009
JP 2010-231082 A 10/2010
(Continued)

OTHER PUBLICATIONS

Kanako Suzuki, et al. "Visual Connection Identifier for LC Type Connector" Hitachi Metals Technical Review, Hitachi Metals, Ltd., vol. 30, 2014, pp. 40-45. (with Partial English Translation).

*Primary Examiner* — Joseph Feild
*Assistant Examiner* — John Mortell
(74) *Attorney, Agent, or Firm* — McGinn I.P. Law Group, PLLC.

(57) ABSTRACT

A communication light visualization structure includes a duplex LC communication light visualization adapter including an opening portion connected to a first light extraction space and a second light extraction space, and a guide groove formed in the opening portion; and a duplex LC communication light detector including a base portion that has the same cross-sectional shape as the opening portion, a first light receiver that receives first leakage light, a second light receiver that receives second leakage light, a light blocking wall that shields the first light extraction space and the second light extraction space from each other, and a display portion that individually displays a communication status of a first communication path and a second communication path. The guide groove is formed at a position such that cross sections of the opening portion and the base portion fit together in only one direction.

13 Claims, 4 Drawing Sheets

(51) Int. Cl.
*H04B 10/25* (2013.01)
*H04B 17/00* (2015.01)

(56) References Cited

U.S. PATENT DOCUMENTS

| | | | | |
|---|---|---|---|---|
| 2005/0196106 A1* | 9/2005 | Taira | ............... | G02B 6/3849 385/78 |
| 2010/0008676 A1* | 1/2010 | Kojima | ............ | G02B 6/4201 398/141 |
| 2010/0074616 A1* | 3/2010 | Kewitsch | ......... | G02B 6/3825 398/38 |
| 2010/0329604 A1 | 12/2010 | Kojima et al. | | |

FOREIGN PATENT DOCUMENTS

| | | |
|---|---|---|
| JP | 2011-013359 A | 1/2011 |
| JP | 2011-013360 A | 1/2011 |
| JP | 2013-228678 A | 11/2013 |

\* cited by examiner

COMMUNICATION LIGHT VISUALIZATION STRUCTURE

The present application is based on Japanese patent application No. 2015-184103 filed on Sep. 17, 2015, the entire contents of which are incorporated herein by reference.

BACKGROUND OF THE INVENTION

1. Field of the Invention

The present invention relates to a communication light visualization structure that visualizes communication light transmitted through an optical communication path for the purpose of visually checking the communication status of the optical communication path.

2. Description of the Related Art

To date, in optical communication facilities, communication light visualization structures that visualize communication light transmitted through an optical communication path have been used for the purpose of visually checking the communication status of the optical communication path (such as a status as to whether the optical communication path is in use).

An example of existing communication light visualization structures includes a duplex LC communication light visualization adapter for extracting a part of first communication light that is transmitted through a first optical communication path and a part of second communication light that is transmitted through a second optical communication path as leakage light in a combined manner, and a duplex LC communication light detector that detects the leakage light extracted through the LC communication light visualization adapter and that outputs, in a form that a user can visually check, a status as to whether at least one of the first optical communication path and the second optical communication path is in use (see, for example, Kanako Suzuki et al., "Visual Connection Identifier for LC Type Connector", Hitachi Metals Technical Review, Hitachi Metals, Ltd., vol. 30, 2014, Vol. 30, pp. 40-45).

However, existing communication light visualization structures have a problem in that they cannot individually detect first communication light that is transmitted through a first optical communication path and second communication light that is transmitted through a second optical communication path and cannot individually identify the communication status of the first optical communication path and the communication status of the second optical communication path.

SUMMARY OF THE INVENTION

An object of the present invention is to provide a communication light visualization structure with which it is possible to individually identify the communication status of the first optical communication path and the communication status of the second optical communication path.

According to the present invention, a communication light visualization structure includes a duplex LC communication light visualization adapter including an opening portion connected to a first light extraction space to which a part of first communication light transmitted through a first optical communication path is extracted as first leakage light and a second light extraction space to which a part of second communication light transmitted through a second optical communication path is extracted as second leakage light, and a guide groove formed in the opening portion; and a duplex LC communication light detector including a base portion that is removably accommodated in the opening portion and that has the same cross-sectional shape as the opening portion, a first light receiver that is disposed on the base portion, that faces the first light extraction space, and that receives the first leakage light, a second light receiver that is disposed on the base portion, that faces the second light extraction space, and that receives the second leakage light, a light blocking wall that extends from the base portion through a space between the first light receiver and the second light receiver and that is guided by the guide groove and optically shields the first light extraction space and the second light extraction space from each other when the base portion is accommodated in the opening portion, and a display portion that individually displays a communication status of the first optical communication path and a communication status of the second optical communication path. The guide groove is formed at a position such that cross sections of the opening portion and the base portion fit together in only one direction.

Preferably, the light blocking wall includes a metal plate that is insert-molded in a resin.

Preferably, the first light receiver and the second light receiver are each covered with a resin mold that blocks visible light.

Preferably, the first light receiver and the second light receiver are each a surface-mount light receiving device.

The present invention can provide a communication light visualization structure with which it is possible to individually identify the communication status of the first optical communication path and the communication status of the second optical communication path.

DESCRIPTION OF THE PREFERRED EMBODIMENTS

Hereinafter, an embodiment of the present invention will be described with reference to the drawings.

Figure 1:
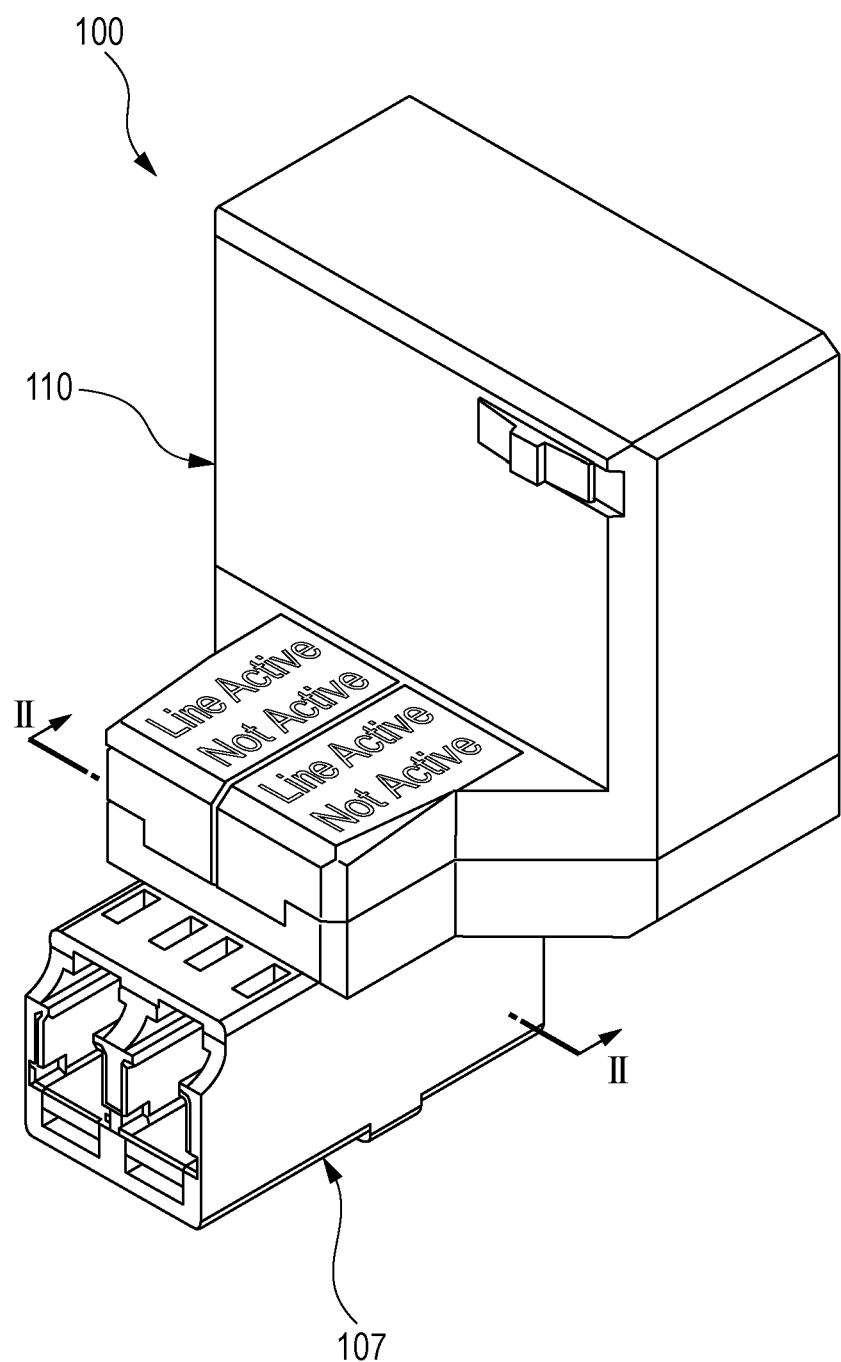
FIG. 1 is a perspective view of a communication light visualization structure according to an embodiment of the present invention.
Figure 2:
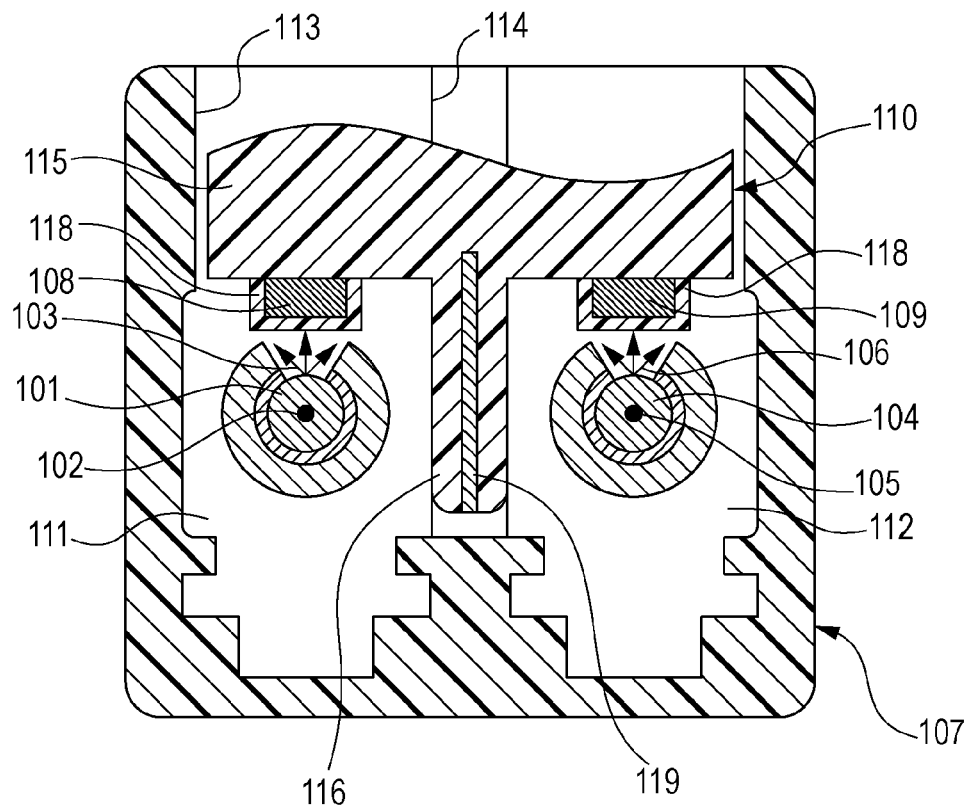
FIG. 2 is a cross-sectional view taken along line II-II of FIG. 1.

As illustrated in FIGS. 1 and 2, a communication light visualization structure 100 according to the embodiment of the present invention includes a duplex LC communication light visualization adapter 107 and a duplex LC communication light detector 110. The duplex LC communication light visualization adapter 107 extracts a part of first communication light 102 transmitted through a first optical communication path 101 as first leakage light 103 and extracts a part of second communication light 105 transmitted through a second optical communication path 104 as second leakage light 106. The duplex LC communication light detector 110 independently detects the first leakage light 103 and the second leakage light 106, which are extracted through the duplex LC communication light visualization adapter 107, respectively by using a first light receiver 108 and a second light receiver 109. Moreover, the duplex LC communication light detector 110 independently outputs, in a form that a user can visually check, a status as to whether the first optical communication path 101 is in use and a status as to whether the second optical communication path 104 is in use.

Figure 3:
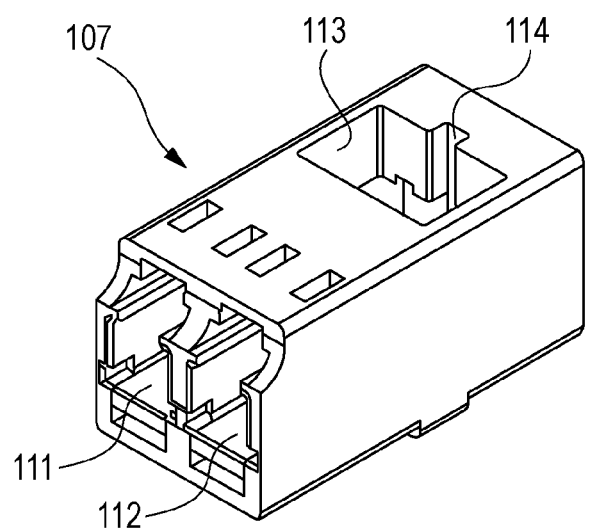
FIG. 3 is a top perspective view of a duplex LC communication light visualization adapter shown in FIG. 1.

As illustrated in FIGS. 2 and 3, the duplex LC communication light visualization adapter 107 includes an opening portion 113 and a guide groove 114 formed in the opening portion 113. The opening portion 113 is connected to a first light extraction space 111, to which a part of the first communication light 102 transmitted through the first optical communication path 101 is extracted as the first leakage light 103, and a second light extraction space 112, to which a part of the second communication light 105 transmitted through the second optical communication path 104 is extracted as the second leakage light 106.

The first optical communication path 101 and the second optical communication path 104 include, for example, optical fibers each including a core and a cladding surrounding the core. A part of the first communication light 102 transmitted through the first optical communication path 101 and a part of the second communication light 105 transmitted through the second optical communication path 104 are extracted, for example, through light extracting portions (not shown) that are disposed in the first optical communication path 101 and the second optical communication path 104.

The light extracting portions each may be formed by forming a groove in the optical fiber or by displacing the optical axis of the optical fiber (see, for example, Japanese Unexamined Patent Application Publications Nos. 2009-145676, 2010-231082, 2011-013359, 2011-013360, and 2013-228678).

When the duplex LC communication light detector 110 is not attached to the duplex LC communication light visualization adapter 107, the first light extraction space 111 and the second light extraction space 112 are connected to each other. When the duplex LC communication light detector 110 is attached to the duplex LC communication light visualization adapter 107, the first light extraction space 111 and the second light extraction space 112 are optically shielded from each other.

Therefore, it is possible to reduce interference (crosstalk) between the first leakage light 103 and the second leakage light 106 when visually checking the communication status of the first optical communication path 101 and the communication status of the second optical communication path 104. Accordingly, it is possible to individually identify the communication status of the first optical communication path 101 and the communication status of the second optical communication path 104.

When the duplex LC communication light detector 110 is not attached to the duplex LC communication light visualization adapter 107, the first light extraction space 111 and the second light extraction space 112 are connected to another space through the opening portion 113. When the duplex LC communication light detector 110 is attached to the duplex LC communication light visualization adapter 107, the first light extraction space 111 and the second light extraction space 112 are optically shielded from the other space.

When the duplex LC communication light detector 110 is attached to the duplex LC communication light visualization adapter 107, the opening portion 113 accommodates the first light receiver 108 and the second light receiver 109. In this state, the duplex LC communication light detector 110 shields the first light receiver 108 and the second light receiver 109 from external light so that the first light receiver 108 can receive only the first leakage light 103 and the second light receiver 109 can receive only the second leakage light 106.

Thus, interference between the first leakage light 103 and external light and interference between the second leakage light 106 and external light are suppressed, and therefore it is possible to accurately identify the communication status of the first optical communication path 101 and the communication status of the second optical communication path 104.

The guide groove 114 is formed at a position such that cross sections of the opening portion 113 and a base portion 115 (described below) fit together in only one direction.

Thus, when attaching the duplex LC communication light detector 110 to the duplex LC communication light visualization adapter 107, the orientation of the duplex LC communication light detector 110 relative to the duplex LC communication light visualization adapter 107 is uniquely determined. Accordingly, it is possible to prevent erroneous identification in that the communication status of the first optical communication path 101 and the communication status of the second optical communication path 104 are confused with each other.

Figure 4:
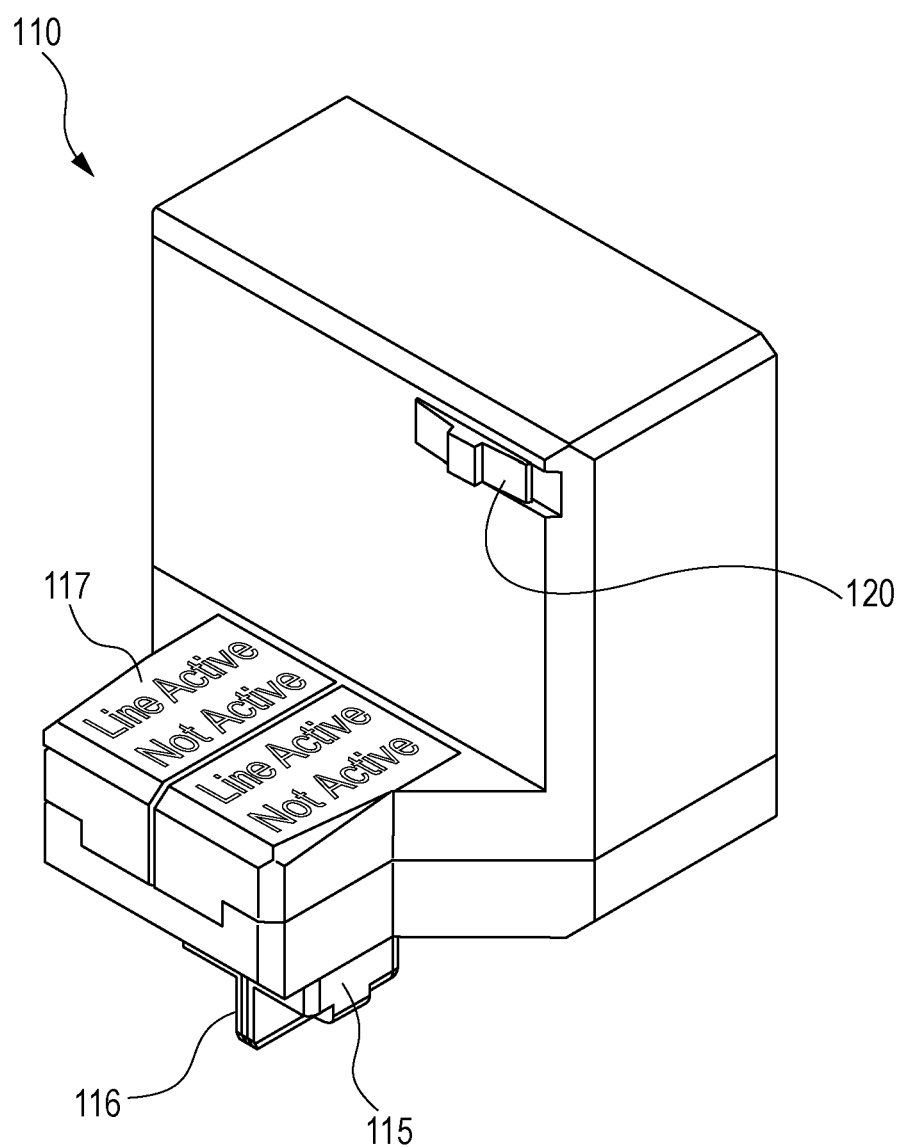
FIG. 4 is a top perspective view of a duplex LC communication light detector shown in FIG. 1.
Figure 5:
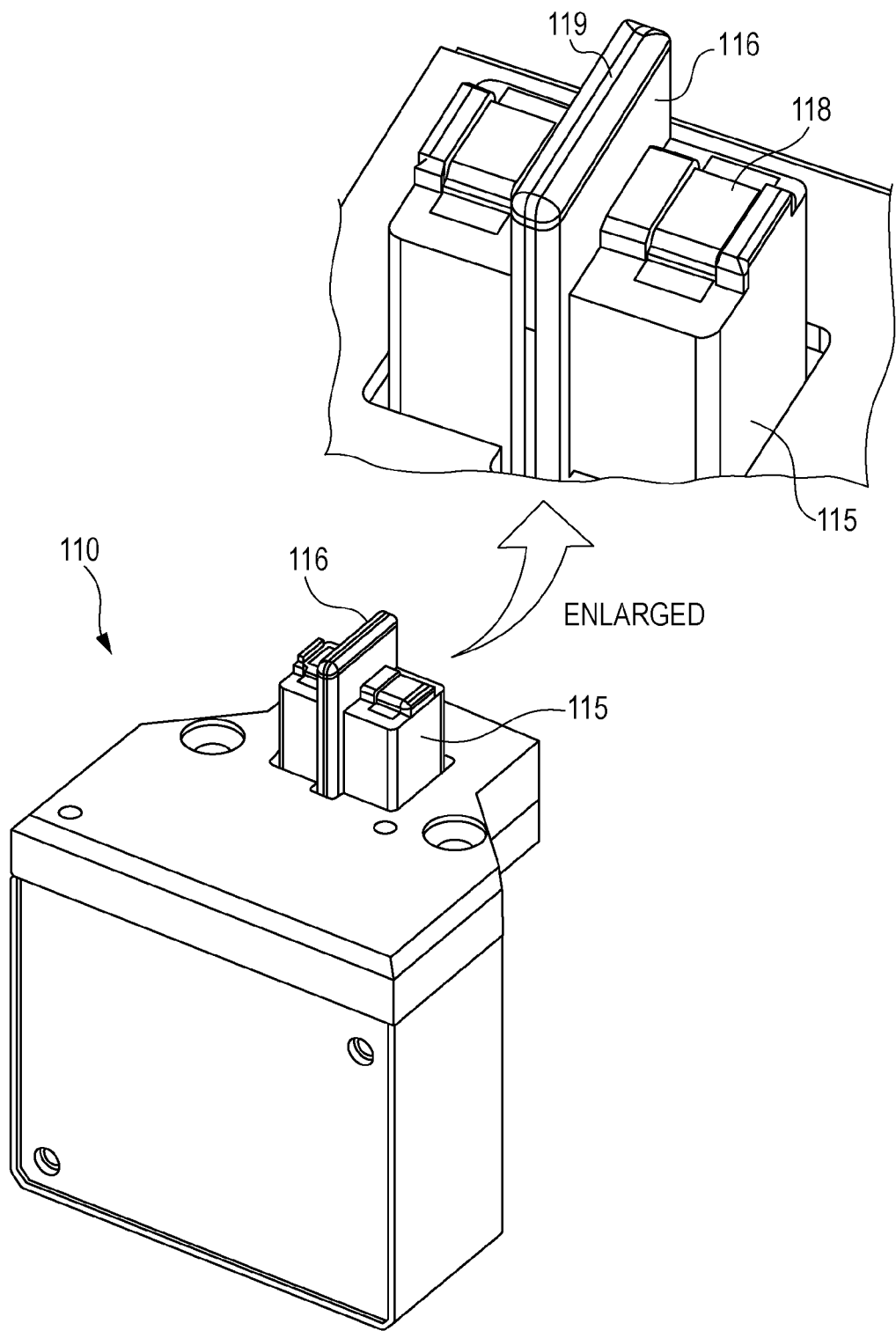
FIG. 5 is a bottom perspective view of the duplex LC communication light detector shown in FIG. 1.

As illustrated in FIGS. 2, 4, and 5, the duplex LC communication light detector 110 includes the base portion 115, the first light receiver 108, the second light receiver 109, a light blocking wall 116, and a display portion 117. The base portion 115 is removably accommodated in the opening portion 113 and has the same cross-sectional shape as the opening portion 113. The first light receiver 108 is disposed on the base portion 115, faces the first light extraction space 111, and receives the first leakage light 103. The second light receiver 109 is disposed on the base portion 115, faces the second light extraction space 112, and receives the second leakage light 106. The light blocking wall 116 extends from the base portion 115 through a space between the first light receiver 108 and the second light receiver 109. The light blocking wall 116 is guided by the guide groove 114 and optically shields the first light extraction space 111 and the second light extraction space 112 from each other when the base portion 115 is accommodated in the opening portion 113. The display portion 117 individually displays the communication status of the first optical communication path 101 and the communication status of the second optical communication path 104.

When the duplex LC communication light detector 110 is attached to the duplex LC communication light visualization adapter 107, the base portion 115 is accommodated in the opening portion 113.

Thus, it is possible to locate the first light receiver 108 close to the light extracting portion of the first optical communication path 101 and to locate the second light receiver 109 close to the light extracting portion of the second optical communication path 104. Therefore, even when the amount of light extracted from each light extracting portion is small, that is, even when a transmission loss at the light extracting portion is reduced to the minimum, it is possible to reliably detect the first leakage light 103 by using the first light receiver 108 and it is possible to reliably detect the second leakage light 106 by using the second light receiver 109.

As described above, the base portion 115 is accommodated in the opening portion 113 when the duplex LC communication light detector 110 is attached to the duplex LC communication light visualization adapter 107. Therefore, interference between the first leakage light 103 and external light and interference between the second leakage light 106 and external light are suppressed. Accordingly, it is possible to accurately identify the communication status of the first optical communication path 101 and the communication status of the second optical communication path 104.

Preferably, the first light receiver 108 and the second light receiver 109 are each covered with a resin mold 118 that blocks external light (visible light). In this case, it is possible to prevent external light from reaching the first light receiver 108 and the second light receiver 109. Therefore, it is possible to effectively suppress interference between the first leakage light 103 and external light and interference between the second leakage light 106 and external light.

Preferably, the first light receiver 108 and the second light receiver 109 are each a surface-mount light receiving device. In this case, it is possible to locate the first light receiver 108 close to the light extracting portion of the first optical communication path 101 and to locate the second light receiver 109 close to the light extracting portion of the second optical communication path 104. Therefore, it is possible to reliably identify the communication status of the first optical communication path 101 and the communication status of the second optical communication path 104.

Preferably, the light blocking wall 116 includes a metal plate 119 that is insert-molded in a resin. In this case, even if the first leakage light 103 or the second leakage light 106 passes through the resin, the metal plate 119 can reliably reflect the first leakage light 103 or the second leakage light 106. Therefore, it is possible to effectively prevent interference between the first leakage light 103 and the second leakage light 106 and to efficiently receive the first leakage light 103 and the second leakage light 106 by using the first light receiver 108 and the second light receiver 109.

The display portion 117 individually outputs, in a form that a user can visually check, a status as to whether each of the first optical communication path 101 and the second optical communication path 104 is in use by using, for example, a light-emitting device or a liquid crystal display. Thus, it is possible to visually check the communication status of the first optical communication path 101 and the communication status of the second optical communication path 104.

The display portion 117 is turned on/off by using a power switch 120. Thus, it is possible to eliminate unnecessary consumption of electric power.

Parts of the communication light visualization structure 100 that need to be optically shielded may be made from a black resin, such as acrylonitrile butadiene styrene (ABS) resin, polycarbonate (PC) resin, or polybutylene terephthalate (PBT) resin.

As described above, the present invention can provide the communication light visualization structure 100 with which it is possible to individually identify the communication status of the first optical communication path 101 and the communication status of the second optical communication path 104.

What is claimed is:

1. A communication light visualization structure comprising:
    a duplex LC communication light visualization adapter including
        an opening portion connected to a first light extraction space to which a part of first communication light transmitted through a first optical communication path is extracted as first leakage light and a second light extraction space to which a part of second communication light transmitted through a second optical communication path is extracted as second leakage light, and
        a guide groove formed in the opening portion; and
    a duplex LC communication light detector including
        a base portion that is removably accommodated in the opening portion and that has the same cross-sectional shape as the opening portion,
        a first light receiver that is disposed on the base portion, that faces the first light extraction space, and that receives the first leakage light,
        a second light receiver that is disposed on the base portion, that faces the second light extraction space, and that receives the second leakage light,
        a light blocking wall that extends from the base portion through a space between the first light receiver and the second light receiver and that is guided by the guide groove and optically shields the first light extraction space and the second light extraction space from each other when the base portion is accommodated in the opening portion, and
        a display portion that individually displays a communication status of the first optical communication path and a communication status of the second optical communication path,
    wherein the guide groove is formed at a position such that cross sections of the opening portion and the base portion fit together in only one direction, and
    wherein the light blocking wall enters the guide groove and slides along to the guide groove when the opening portion and the base portion are fitted together.

2. The communication light visualization structure according to claim 1,
    wherein the light blocking wall includes a metal plate that is insert-molded in a resin.

3. The communication light visualization structure according to claim 1,
    wherein the first light receiver and the second light receiver are each covered with a resin mold that blocks visible light.

4. The communication light visualization structure according to claim 1,
    wherein the first light receiver and the second light receiver are each a surface-mount light receiving device.

5. The communication light visualization structure according to claim 1, wherein the first optical communication path and the second optical communication path include optical fibers each including a core and a cladding surrounding the core.

6. The communication light visualization structure according to claim 1, wherein a part of the first communication light transmitted through the first optical communication path and a part of the second communication light transmitted through the second optical communication path are extracted through light extracting portions that are disposed in the first optical communication path and the second optical communication path.

7. The communication light visualization structure according to claim 1, wherein, when the duplex LC communication light detector is not attached to the duplex LC communication light visualization adapter, the first light extraction space and the second light extraction space are connected to each other, and
    wherein, when the duplex LC communication light detector is attached to the duplex LC communication light visualization adapter, the first light extraction space and the second light extraction space are optically shielded from each other.

8. The communication light visualization structure according to claim 1, wherein, when the duplex LC communication light detector is not attached to the duplex LC communication light visualization adapter, the first light extraction space and the second light extraction space are connected to each other, and when the duplex LC communication light detector is attached to the duplex LC communication light visualization adapter, the first light extraction space and the second light extraction space are optically shielded from each other, thereby to reduce interference between the first leakage light and the second leakage light when visually checking the communication status of the first optical communication path and the communication status of the second optical communication path.

9. The communication light visualization structure according to claim 1, wherein, when the duplex LC communication light detector is not attached to the duplex LC communication light visualization adapter, the first light extraction space and the second light extraction space are connected to another space through the opening portion, and wherein, when the duplex LC communication light detector is attached to the duplex LC communication light visualization adapter, the first light extraction space and the second light extraction space are optically shielded from the other space.

10. The communication light visualization structure according to claim 1, wherein, when the duplex LC communication light detector is attached to the duplex LC communication light visualization adapter, the base portion is accommodated in the opening portion.

11. The communication light visualization structure according to claim 1, wherein the base portion is accommodated in the opening portion when the duplex LC communication light detector is attached to the duplex LC communication light visualization adapter thereby suppressing an interference between the first leakage light and external light and an interference between the second leakage light and the external light.

12. The communication light visualization structure according to claim 1, wherein, when the duplex LC communication light detector is attached to the duplex LC communication light visualization adapter, the opening portion accommodates the first and second light receivers.

13. The communication light visualization structure according to claim 1, wherein, the light blocking wall slides in the guide groove when the opening portion and the base portion are fitted together.

* * * * *